(12) United States Patent
Fujiyoshi

(10) Patent No.: US 7,372,812 B2
(45) Date of Patent: May 13, 2008

(54) PROXY FC PORT, FC NETWORK SYSTEM, AND FC TRANSFER METHOD USED THEREFOR

(75) Inventor: Takeshi Fujiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1015 days.

(21) Appl. No.: 10/639,523

(22) Filed: Aug. 13, 2003

(65) Prior Publication Data
US 2004/0032874 A1 Feb. 19, 2004

(30) Foreign Application Priority Data
Aug. 14, 2002 (JP) ............................. 2002-236178

(51) Int. Cl.
H04L 12/54 (2006.01)
(52) U.S. Cl. ...................... 370/231; 370/234; 370/428
(58) Field of Classification Search ................ 370/229, 370/230, 230.1, 231, 235, 360, 363, 368, 370/371, 374, 378, 381, 383, 428, 429; 709/212–215
See application file for complete search history.

(56) References Cited
U.S. PATENT DOCUMENTS 5,528,591 A 6/1996 Lauer
5,610,745 A * 3/1997 Bennett ........................ 398/52
6,304,910 B1 * 10/2001 Roach et al. ................ 709/236
6,925,058 B2 * 8/2005 Jones et al. .................. 370/235
6,975,623 B2 * 12/2005 Nelson et al. ............... 370/352
2003/0016683 A1 1/2003 George et al.

FOREIGN PATENT DOCUMENTS

JP 8-251201 9/1996
JP 2003-516657 5/2003

* cited by examiner

Primary Examiner—Wing Chan
Assistant Examiner—Duc Duong
(74) Attorney, Agent, or Firm—Foley & Lardner LLP

(57) ABSTRACT

Proxy FC ports in an FC network are connected between first and second FC (Fibre Channel) devices having reception buffers and first and second FC transfer apparatuses connected to each other through a WAN (Wide Area Network). The proxy FC ports transfer signals to be exchanged between the first and second FC devices. The proxy FC ports include Frame FIFOs and transmission control sections. The Frame FIFOs have larger capacities than the reception buffers. The transmission control section performs flow control on the first and second FC devices on the basis of the remaining capacities of the Frame FIFOs. An FC network system and FC transfer method are also dislosed.

15 Claims, 13 Drawing Sheets

FIG. 3B

FLOGI/PLOGI FRAME

FIG. 3A

ELP FRAME

ELP FRAME

| FIELD NAME | ELP Request | ELP Accept | Reject |
|---|---|---|---|
| SOF delimiter | SOFf | SOFf | SOFf |
| R_CTL | 0x02 | 0x03 | 0x03 |
| TYPE | 0x22 | 0x22 | 0x22 |
| SW_ILS Command Code | 0x10000000 | 0x02000000 | 0x01000000 |

FIG.4A

FLOGI/PLOGI FRAME

| FIELD NAME | PLOGI Request | PLOGI Accept | FLOGI Request | FLOGI Accept | Reject |
|---|---|---|---|---|---|
| SOF delimiter | ONE OF SOFc1, SOFi2, AND SOFi3 | ONE OF SOFc1, SOFi2, AND SOFi3 | ONE OF SOFc1, SOFi2, AND SOFi3 | ONE OF SOFc1, SOFi2, AND SOFi3 | ONE OF SOFc1, SOFi2, AND SOFi3 |
| R_CTL | 0x22 | 0x23 | 0x22 | 0x23 | 0x23 |
| TYPE | 0x01 | 0x01 | 0x01 | 0x01 | 0x01 |
| LS_Command Code | 0x03000000 | 0x02000000 | 0x04000000 | 0x02000000 | 0x01000000 |
| Common Features [12] | 0 | 0 | 0 | 1 | |

FIG.4B

PROXY FC PORT, FC NETWORK SYSTEM, AND FC TRANSFER METHOD USED THEREFOR

BACKGROUND OF THE INVENTION

The present invention relates to a proxy FC (Fibre Channel) port, an FC network system, and an FC transparent transfer method used therefor and, more particularly, to an FC transparent transfer method of transparently transferring FC signals on a WAN (Wide Area Network).

FC is a communication protocol used to build a SAN (Storage Area Network) by connecting a plurality of storage devices and host computers.

The specifications of FC are standardized by "ANSI X3.230-1994, Fibre Channel Physical and Signaling Interface (FC-PH)" and the like.

A wide area SAN can be built by long-distance-connecting two FC devices through a WAN using a technique (FC transparent transfer) of transparently transferring FC signals on an existing WAN. An apparatus which implements FC transparent transfer can be manufactured at a low cost by using simple hardware because there is no need to terminate a protocol higher than the FC-1 layer in converting signals.

A connection example for a network using the above FC transparent transfer will be described with reference to FIG. 12. Referring to FIG. 12, FC devices 41, 44, 45-1 to 45-3, and 46-1 to 46-3 are devices having FC interfaces, e.g., storage devices and host computers.

Each of FC transparent transfer apparatuses 42 and 43 has a function of transparently transferring FC signals on a WAN 400. The FC signal transmitted from the FC device 41 to the FC device 44 is converted into a signal for the WAN 400 by the FC transparent transfer apparatus 42, and transferred to the FC transparent transfer apparatus 43.

The FC transparent transfer apparatus 43 reconstructs an FC signal from the sign al received from the WAN 400, and transfers the signal to the FC device 44. The same processing is performed for the FC signal transmitted from the FC device 44 to the FC device 41.

When a frame is to be transferred between the FC devices 41 and 44, frame loss is prevented by BB flow control (Buffer-to-buffer flow control). BB flow control processing will be described below.

Reception buffers exist in the interface sections of the FC devices 41, 44, 45-1 to 45-3, and 46-1 to 46-3. The maximum number of frames that can be stored in each reception buffer is called BB_Credit (Buffer-to-Buffer Credit).

The two FC devices 41 and 44 connected by FC exchange their BB_Credits by using a predetermined protocol to know the reception buffer sizes of the respective remote devices. Each of the FC devices 41, 44, 45-1 to 45-3, and 46-1 to 46-3 returns a control signal called R_RDY (Receiver Ready) to a transmission source FC device every time one frame is received.

The FC device on the transmitting side counts the number of frames transmitted and the number of R_RDYs received to monitor the remaining amount (remaining capacity) of the reception buffer of the remote device. When the difference between the number of frames transmitted and the number of R_RDYs received reaches the value of BB_Credit in the remote device, there may be no remaining capacity in the reception buffer of the remote device. Therefore the FC device stops transmitting the next frame until R_RDY is received.

Continuous transfer of frames from the FC device 41 to the FC device 44 in the above arrangement of the FC network will be described with reference to FIGS. 13A and 13B.

Assume that both BB_Credits of the FC devices 41 and 44 are "4", i.e., a maximum of four frames can be stored in each reception buffer. Referring to FIG. 13, the horizontal direction represents the physical position of each device, and the vertical direction represents the time. Each number written on the left side of each drawing indicates the value of the credit counter managed by the FC device 41.

Upon receiving a notification of BB_Credit from the FC device 44, the FC device 41 initializes the credit counter with the value of BB_Credit. The FC device 41 also decrements the credit counter by "1" every time a frame is transmitted, and increments the credit counter by "1" every time R_RDY is received.

When the value of the credit counter becomes "0", there may be no remaining capacity in the reception buffer of the FC device 44. The FC device 41 stops transmitting a frame.

According to the above conventional FC transparent transfer method, when the FC devices 41 and 44 are short-distance-connected to each other as shown in FIG. 13A, since R_RDYs are returned at a rate sufficiently higher than the frame transmission rate, no problem arises.

If, however, the FC devices 41 and 44 are long-distance-connected to each other as shown in FIG. 13B, the frame transmitted from the FC device 41 arrives at the FC device 44 with a larger delay, and R_RDY returned from the FC device 44 arrives at the FC device 41 with a larger delay.

In the case shown in FIG. 13B, when the fourth frame is transmitted, the credit counter becomes "0", transmission of the fifth frame is stopped until next R_RDY is received. As described above, as the connection distance between the FC devices 41 and 44 increases, the data transfer rate decrease.

As is obvious from FIG. 13B, if the FC device 44 incorporates a reception buffer large enough for connection distance, no reduction occurs in data transfer rate.

However, the FC interfaces incorporated in storage devices and host computers are designed on the assumption that they are connected to FC switches over short distances, and hence small-capacity reception buffers are used. For this reason, the connection distance is limited to about several km.

Although some interfaces for connecting FC switches to each other have reception buffers large enough for connection over several 10 km, there is hardly any FC interface having a reception buffer large enough for connection over several 100 km or more. In addition, it is impossible to additionally mount a reception buffer in an existing FC device.

SUMMARY OF THE INVENTION

It is an object of the present invention to provide a proxy FC port and FC network which can virtually increase the reception buffers of FC devices and can prevent a decrease in frame transfer rate due to a delay in a transmission path even if FC devices having small reception buffers are connected, and an FC transparent transfer method used for the proxy FC port and FC network.

In order to achieve the above object, according to the present invention, there is provided a proxy FC port in an FC network, which is connected between first and second FC (Fibre Channel) devices having reception buffers and first and second FC transfer apparatuses connected to each other through a WAN (Wide Area Network), and transfers signals to be exchanged between the first and second FC devices, comprising storage means having a larger capacity than the reception buffer, and transmission control means for performing flow control on the first and second FC devices on the basis of a remaining capacity of the storage means.

BRIEF DESCRIPTION OF THE DRAWINGS

Figures 3A, 3B:
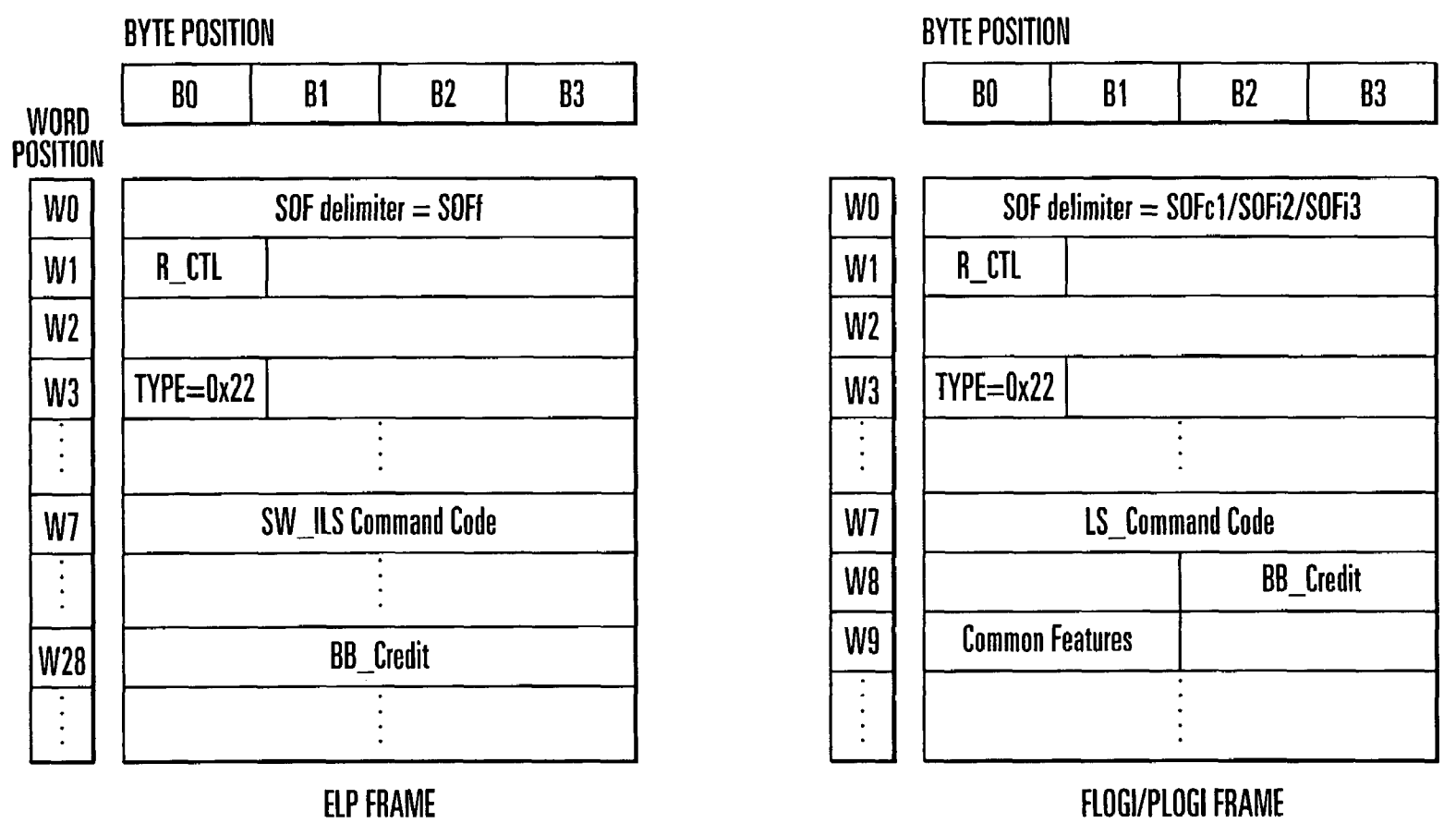

FIG. 3A is a view showing a frame format and field values to which the present invention refers;

FIG. 3B is a view showing a frame format and field values to which the present invention refers;

FIG. 4A is a view showing a frame format and field values to which the present invention refers;

FIG. 4B is a view showing a frame format and field values to which the present invention refers;

DESCRIPTION OF THE PREFERRED EMBODIMENTS

Figure 1:
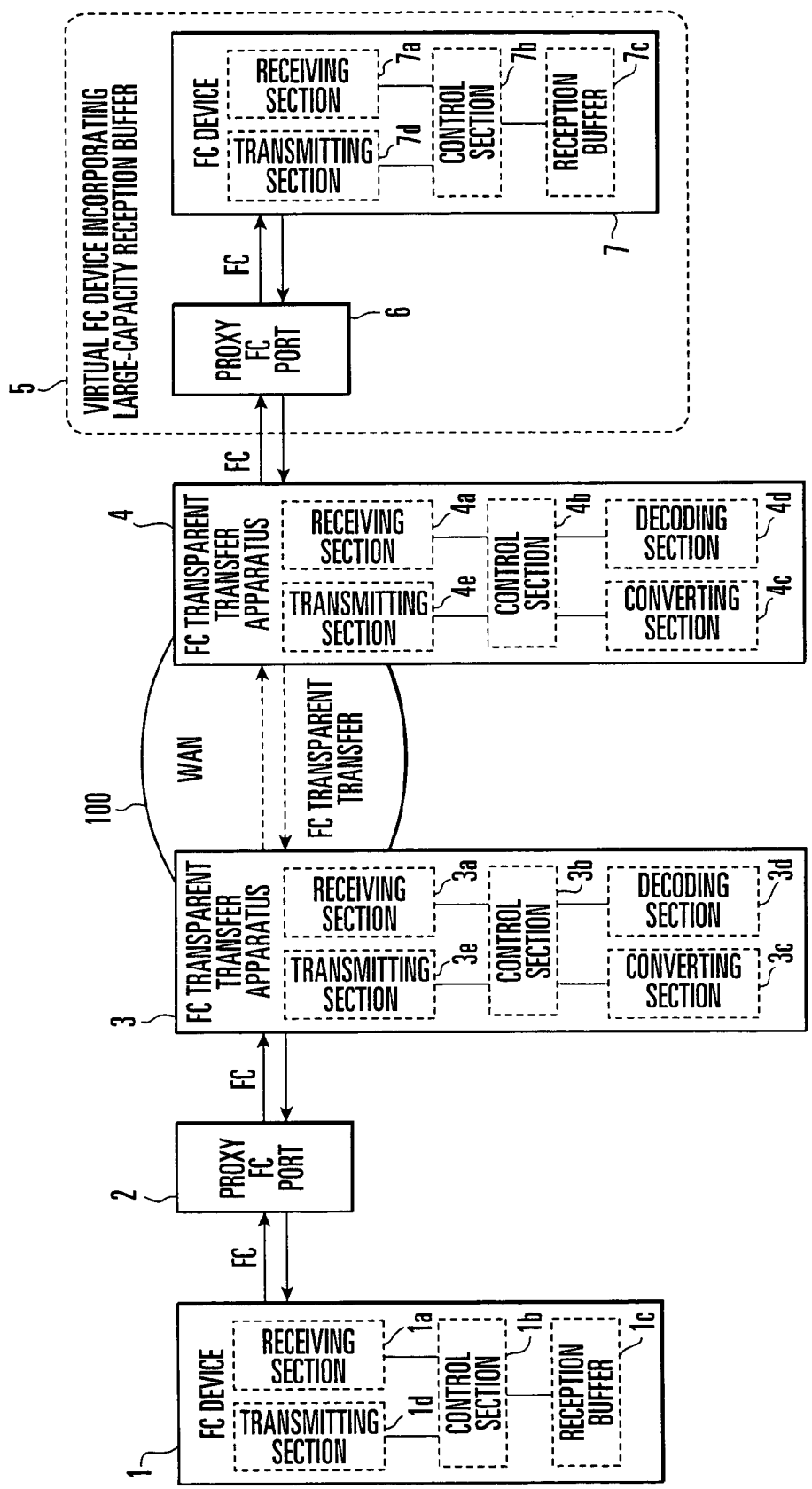
FIG. 1 is a block diagram showing the arrangement of an FC network according to an embodiment of the present invention.

The embodiments of the present invention will be described next with reference to the accompanying drawings. As shown in FIG. 1, an FC network according to an embodiment of the present invention is comprised of FC devices 1 and 7, proxy FC ports 2 and 6 connected to the FC devices 1 and 7, FC transparent transfer apparatuses 3 and 4 connected to the proxy FC ports 2 and 6, and a WAN (Wide Area Network) 100 which connects the FC transparent transfer apparatuses 3 and 4 to each other.

The FC devices 1 and 7 are devices having FC interfaces. FC nodes placed at the ends of the FC network and FC switches as constituent elements of a fabric correspond to the FC devices 1 and 7. The FC devices 1 and 7 include receiving sections 1a and 7a, control sections 1a and 7b which are connected to the receiving sections 1a and 7a and control the respective sections of the FC devices 1 and 7, reception buffers 1c and 7c, and transmitting sections 1d and 7d.

The FC transparent transfer apparatuses 3 and 4 are apparatuses having functions of converting FC-1layer signals received from the FC devices 1 and 7 into various kinds of WAN (Wide Area Network) signals and transferring them to the remote FC transparent transfer apparatuses 4 and 3 and functions of reconstructing various WAN signal into FC-1 layer signals and transmitting them to the FC devices 1 and 7.

More specifically, the FC transparent transfer apparatuses 3 and 4 include receiving sections 3a and 4a which receive FC-1 layer signals from the FC devices 1 and 7, and converting sections 3c and 4c which convert the received FC-1 layer signals into various kinds of WAN (Wide Area Network) signals. The FC transparent transfer apparatuses 3 and 4 include transmitting sections 3e and 4e which transmit various kinds of WAN signals obtained by conversion to the remote FC transparent transfer apparatuses 4 and 3 through the WAN 100, and decoding sections 3d and 4d which decode FC-1 layer signals from the WAN signals. The FC transparent transfer apparatuses 3 and 4 also include control sections 3b and 4b which are connected to the respective sections described above and control them. The transmitting sections 3e and 4e of the FC transparent transfer apparatuses 3 and 4 have functions of transmitting the FC-1 layer signals decoded by the decoding sections 3d and 4d to the FC devices 1 and 7.

In signal conversion from FC-1 layer signals into WAN signals, the FC transparent transfer apparatuses 3 and 4 do not terminate protocols at layers higher than FC-1 but transparently transfer the layers higher than FC-1.

The use of the FC transparent transfer apparatuses 3 and 4 described above makes it possible to build a wide area FC network using the existing WAN 100.

The proxy FC ports 2 and 6 provide large-capacity reception buffers in place of the adjacent FC devices 1 and 7 to allow long-distance transmission between the FC devices 1 and 7 through the WAN 100.

The proxy FC ports 2 and 6 function as some of the FC ports of the adjacent FC devices 1 and 7. For example, the FC device 7 and proxy FC port 6 behave as a virtual FC device 5 incorporating a large-capacity reception buffer.

Figure 2:
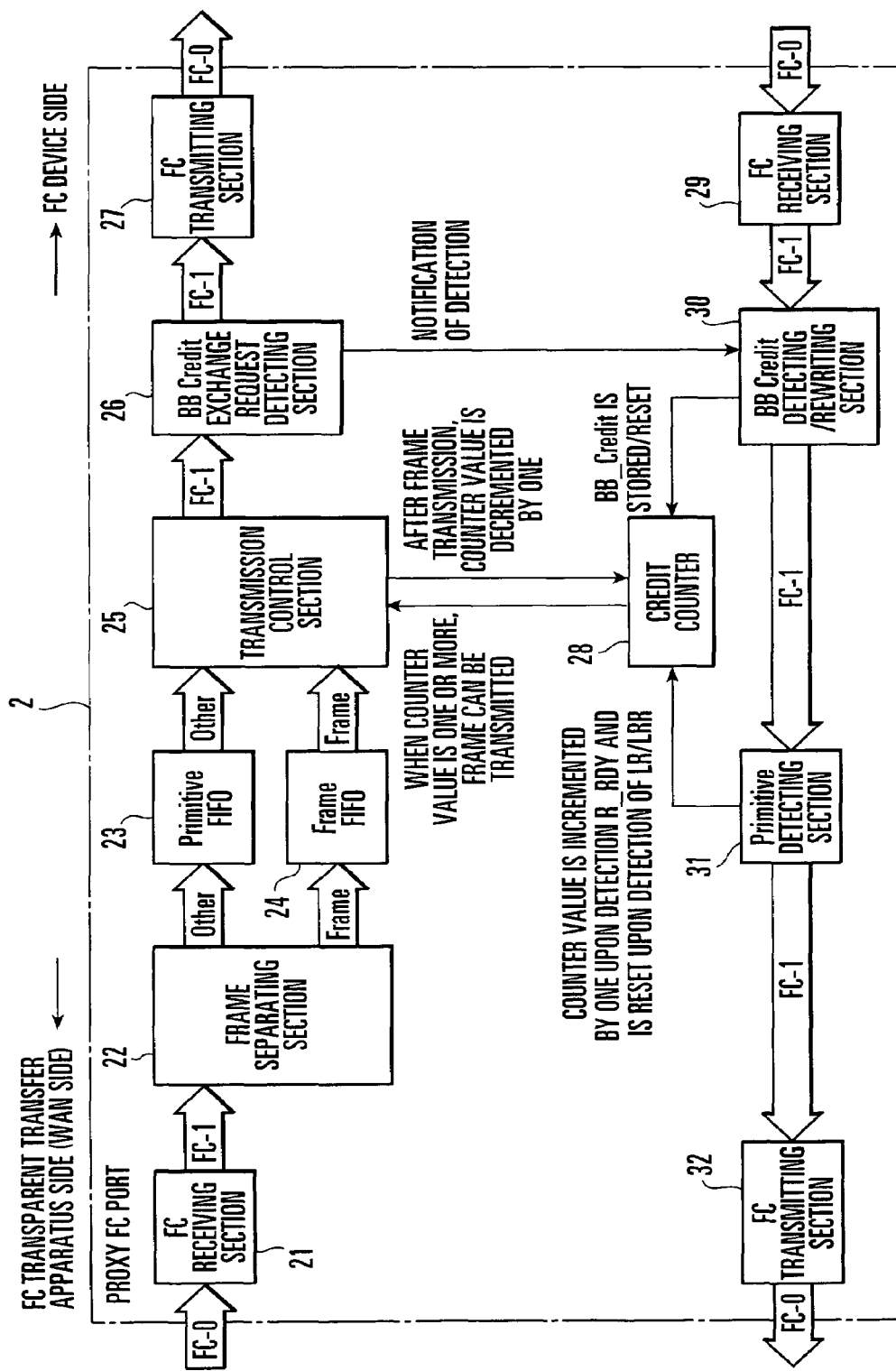
FIG. 2 is a block diagram showing the internal arrangement of a proxy FC port in FIG. 1.

As shown in FIG. 2, the proxy FC port 2 includes an FC receiving section 21, a frame separating section 22 connected to the FC receiving section 21, a Primitive FIFO (First-In First-Out) 23 connected to the frame separating section 22, and a Frame FIFO 24.

The proxy FC port 2 includes a transmission control section 25 connected to the Primitive FIFO (First-In First-Out) 23 and Frame FIFO 24, a BB_Credit exchange request detecting section 26 connected to the transmission control section 25, and an FC transmitting section 27 connected to the BB_Credit exchange request detecting section 26.

The proxy FC port 2 also includes a credit counter 28 connected to the transmission control section 25, a Primitive detecting section 31 connected to the credit counter 28, and an FC transmitting section 32 connected to the Primitive detecting section 31.

The proxy FC port 2 further includes a BB_Credit detecting/rewriting section 30 connected to the BB_Credit exchange request detecting section 26, credit counter 28, and Primitive detecting section 31 and an FC receiving section 29 connected to the BB_Credit detecting/rewriting section 30.

The FC receiving sections 21 and 29 reconstruct FC-1 layer uncoded bit strings from FC-0 layer optical signals input from the FC device 1, and transfer the resultant data byte (8 data bits+1 control bit) by byte to the next blocks. At the same time, the FC receiving sections 21 and 29 generate clocks synchronized with these byte strings and provide them to other blocks.

The FC transmitting sections 27 and 32 superimpose the FC-1 layer uncoded bit strings transferred byte by byte from the preceding blocks on the FC-0 layer optical signals and output the resultant signals to channels to the FC device 1.

The frame separating section 22 stores, among the FC-1 layer signals received from the WAN 100 side (FC transparent transfer apparatus 3 side), Class 1 connect-request, Class 2, Class 3, and Class F frames to be subjected to BB flow control (Buffer-to-buffer flow control) in the Frame FIFO 24.

The frame separating section 22 also stores, in the Primitive FIFO 23, signals other than those stored in the Frame FIFO 24. At this time, if Idles corresponding to three words or more continue, Idles after the third word are not stored in either of the FIFOs and are discarded.

Each frame starts with an SOF (Start-Of-Frame) delimiter, and ends with an EOF (End-Of-Frame) delimiter.

As SOF delimiters, SOFC1 is added to the head of a Class 1 connect-request frame; SOFi2 or SOFn2, to the head of a Class 2 frame; SOFi3 or SOFn3, to the head of a Class 3 frame; and SOFf, to the head of a Class F frame. By detecting these signals, frames to be subjected to BB flow control are identified.

The Primitive FIFO 23 is a FIFO memory for storing, among the FC-1 layer signals received from the WAN 100 side (FC transparent transfer apparatus 3 side), signals which are not subjected to BB flow control. The Primitive FIFO 23 performs write and read operations on a word basis (one word=4 bytes).

The signals stored in the Primitive FIFO 23 are transmitted on a top-priority basis regardless of flow control. Therefore, it suffices if the Primitive FIFO 23 have a size of several kbytes.

The Frame FIFO 24 is a FIFO memory for storing, among the FC-1 layer signals received from the WAN 100 (FC transparent transfer apparatus 3 side), Class 1 connect-request, Class 2, Class 3, and Class F frames. The Frame FIFO 24 performs write and read operations on a frame basis.

The frames stored in the Frame FIFO 24 are transmitted to the adjacent FC device 1 if its reception buffer (not shown) has a free space.

When the Primitive detecting section 31 detects LR (Link Reset) or LRR (Link Reset Response), all the frames stored in the Frame FIFO 24 are discarded.

When the BB_Credit detecting/rewriting section 30 detects a parameter exchange frame, all the frames stored in the Frame FIFO 24 are discarded.

The Frame FIFO 24 provides the function of a large-capacity reception buffer to cope with long-distance transmission in place of the adjacent FC device 1. In order to cope with connection over a long distance of several hundred km or more between the FC devices 1 and 7, the reception buffer needs to have a size large enough to store several hundred frames. Assume that a buffer size for one frame is fixed to two kbytes.

The transmission control section 25 determines a signal (word) to be transmitted next to the adjacent FC device 1 on the basis of the internal states of the Primitive FIFO 23, Frame FIFO 24, and credit counter 28. The transmission control section 25 then transfers the determined signal to the BB_Credit exchange request detecting section 26.

This processing is performed on the basis of the following rules.

(1) When both the Primitive FIFO 23 and the Frame FIFO 24 are empty, Idle is transmitted.

(2) When the Primitive FIFO 23 is not empty, the first word in the Primitive FIFO 23 is transmitted.

(3) One-frame data is transmitted from the Frame FIFO 24 when the Primitive FIFO 23 is empty, the Frame FIFO 24 is not empty, and the current value of the credit counter 28 is "1" or more.

(4) When a frame is to be transmitted from the Frame FIFO 24 or Primitive FIFO 23, Idle is inserted as needed in such a manner that consecutive idles corresponding to two or more words are inserted before the SOF delimiter.

(5) When a frame is to be transmitted from the Frame FIFO 24 or Primitive FIFO 23, Idle is inserted as needed in such a manner that consecutive Primitive Signals corresponding to six or more words are inserted between the EOF delimiter and the next SOF delimiter.

(6) When a frame is transmitted from the Frame FIFO 24 or Primitive FIFO 23, Idle is inserted as needed in such a manner that consecutive Idles corresponding to one or more words are inserted immediately after the EOF delimiter.

Upon detecting R_RDY (Receiver Ready) from the FC-1 layer signal received from the adjacent FC device 1, the Primitive detecting section 31 increments the credit counter 28 by "1".

Upon detecting LR or LRR, the Primitive detecting section 31 resets the credit counter 28 with the value of BB_Credit (reception buffer size) of the adjacent FC device 1.

The BB_Credit exchange request detecting section 26 and BB_Credit detecting/rewriting section 30 are blocks for detecting and rewriting BB_Credit notified from the adjacent FC device 1 to the other FC device 7.

The protocol to be used to notify BB_Credit varies depending on the connection form between the FC devices 1 and 7. Therefore, a DIP switch or the like is used to allow a user to set a connection form in advance, and operations are switched in accordance with the setting.

If, for example, both the FC devices 1 and 7 are FC switches, BB_Credit is exchanged by a protocol called ELP (Exchange Link Parameters).

According to ELP, BB_Credit is stored in a ELP Request frame and transferred from one FC switch to the other FC switch. As a response, BB_Credit is stored in an ELP Accept frame and returned.

If both the FC devices 1 and 7 are FC nodes, BB_Credit is exchanged by a protocol called PLOGI (N_Port Login).

According to PLOGI, BB_Credit is stored in a PLOGI Request frame and transferred from one FC node to the other FC node. As a response, BB_Credit is stored in a PLOGI Accept frame and returned.

If one of the two FC devices 1 and 7 is an FC switch and the other is an FC node, BB_Credit is exchanged by a protocol called FLOGI (Fabric Login).

According to FLOGI, BB_Credit is stored in an FLOGI Request frame and transferred from the FC node to the FC switch. As a response, BB_Credit is stored in an FLOGI Accept frame and returned.

FIGS. 3A, 3B, 4A, and 4B show frame formats and field values which are used to identify Request frames and Accept frames used in these protocols.

Consider, for example, a frame which starts with an SOFf delimiter and has "0×02" as the 0th byte (R_CTL) of the first word, "0x22" as the 0th byte (TYPE) of the third word, and "0x10000000" as the seventh word (SW_ILS Command Code). This frame can be identified as an ELP Request frame.

The BB_Credit exchange request detecting section 26 detects the above Request frame to be transferred from the WAN 100 side toward the adjacent FC device 1, and notifies the BB_Credit detecting/rewriting section 30 of the corresponding information. This detection is required to identify an Accept frame in the BB_Credit detecting/rewriting section 30.

The BB_Credit detecting/rewriting section 30 detects the above Request frame or Accept frame to be transferred from the adjacent FC device 1 to the other FC device 7, reads out BB_Credit stored in the frame, and resets the credit counter 28 with the readout value. At the same time, the BB_Credit detecting/rewriting section 30 rewrites the value of blood vessel stored in the frame into the number of frames that can be stored in the Frame FIFO 24 and transmits it.

In this case, the field values of the respective Accept frames shown in FIGS. 3A, 3B, 4A, and 4B are shared by other protocols, no Accept frame can be specified only by checking whether these field values coincide witch each other. For this reason, a condition that the corresponding Request frame has been detected by the BB_Credit exchange request detecting section 26 is added to the determination conditions for the detection of an Accept frame.

Upon receiving a notification of detection of a Request frame from the BB_Credit exchange request detecting section 26, the BB_Credit detecting/rewriting section 30 sets an internal flag (not shown). If the flag is set upon detection of an Accept frame, the BB_Credit detecting/rewriting section 30 reads out and rewrites BB_Credit.

At the same time, the BB_Credit detecting/rewriting section 30 clears the flag. In addition, upon detection of Reject (rejection) frame, the BB_Credit detecting/rewriting section 30 unconditionally clears the flag. Field values for specifying Reject frames are also shown in FIGS. 3A, 3B, 4A, and 4B.

The credit counter 28 is a counter for managing the remaining amount (remaining capacity) of the reception buffer of the adjacent FC device 1. The initial value of this counter is set to "1" or more. When the BB Credit detecting/rewriting section 30 detects a frame for a BB_Credit exchange, the value of BB_Credit is set in the credit counter 28.

When the Primitive detecting section 31 detects LR or LRR, the credit counter 28 is reset to the value of BB_Credit in the adjacent FC device 1 which is detected at last.

When the Primitive detecting section 31 detects R_RDY, the credit counter 28 is incremented by "1". When the transmission control section 25 transmits one frame from the Frame FIFO 24, the credit counter 28 is decremented by "1".

When the value of this counter is "0", it indicates that the reception buffer of the adjacent FC device 1 is empty. At this time, the transmission control section 25 is made to stop frame transmission from the Frame FIFO 24.

Although not shown, the proxy FC port 6 has the same arrangement as that of the proxy FC port 2, and operates in the same manner as the proxy FC port 2 described above.

The operation of the proxy FC ports 2 and 6 will be described with reference to FIGS. 1 to 9 in cases of BB_Credit exchange, continuous transfer of frames, and "Link Reset" between the two FC devices 1 and 7.

Referring to FIGS. 5 to 9, the horizontal direction indicates the physical position of each device, and the vertical direction indicates the time. Each solid line arrow represents the transfer of a frame, and the broken line arrow represents the transfer of R_RDY.

Assume that the two FC devices 1 and 7 are FC switches each having a reception buffer represented by BB_Credit=4. Each of the proxy FC ports 2 and 6 has the Frame FIFO 24 large enough to store 1,024 frames, and is long-distance-connected through the WAN 100.

The number drawn on the axis of each device or on its side indicates the value of the credit counter managed by the corresponding device. When the FC device 1 or 7 transmits one frame, the value of the credit count is decremented by "1". Upon receiving R_RDY, the FC device 1 or 7 increments the counter value by "1".

When a frame for a BB_Credit exchange (ELP Request or ELP Accept) is received, the credit counter is reset to the value of BB_Credit stored in the frame. Likewise, before LR or LRR is transmitted, the credit counter is reset to the exchanged value. The function of the credit counter 28 of each of the proxy FC ports 2 and 6 has been described above.

Figure 5:
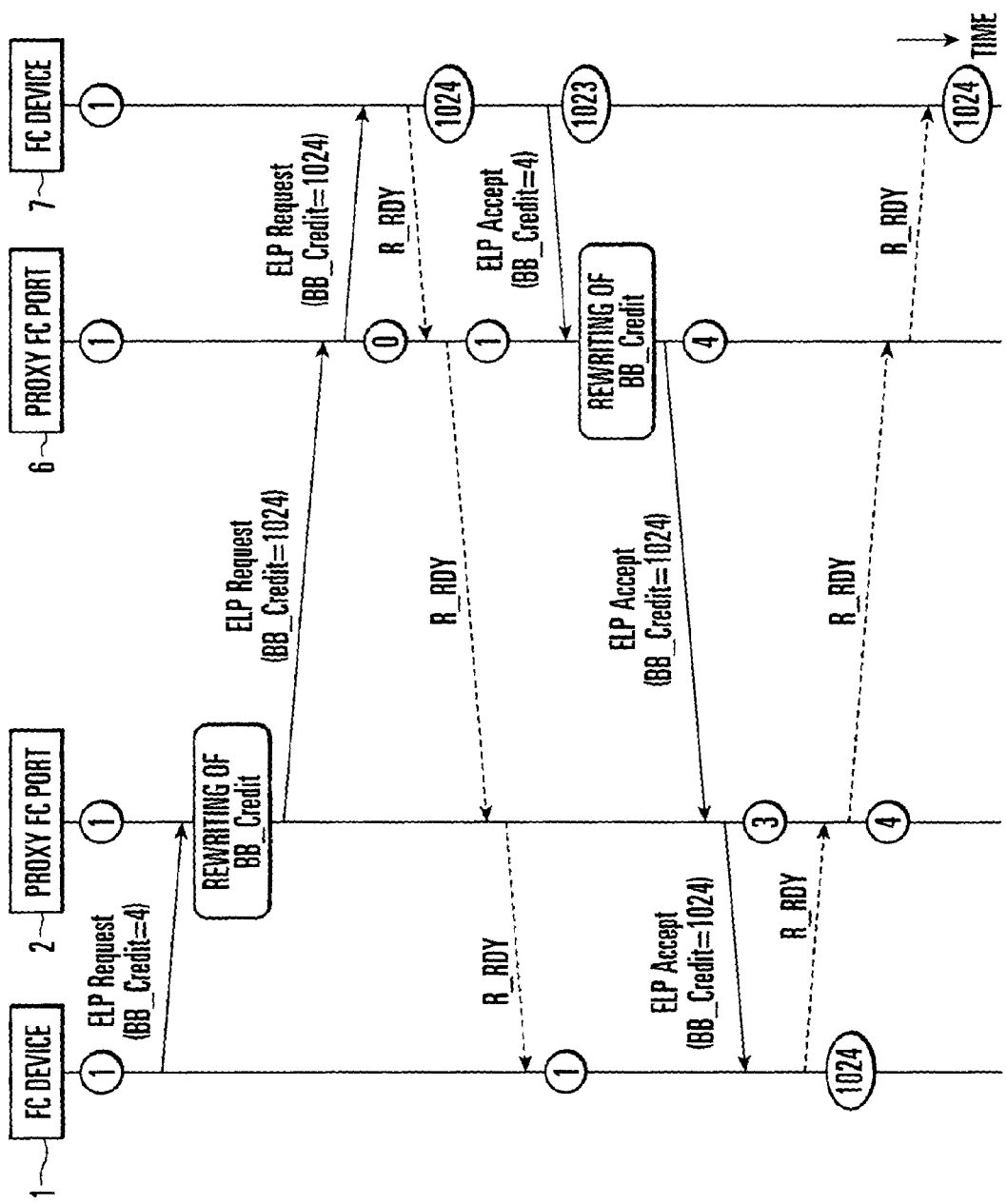
FIG. 5 is a view showing operation to be performed when processing is performed in the FC devices and proxy FC ports in FIG. 1.

FIG. 5 shows how BB_Credit is exchanged between the FC device 1 and the FC device 7 according to ELP (Exchange Link Parameters). Assume that the initial value of the credit counter of each device is "1".

First of all, the FC device 1 stores BB_Credit=4 in an ELP Request frame and transmits the frame to the FC device 7. The proxy FC port 2 detects this frame through the BB_Credit detecting/rewriting section 30, and sets BB_Credit (=4) of the FC device 1, stored in the frame, in the credit counter 28. At the same time, the proxy FC port 2 rewrites the value of BB_Credit in the frame into the size (=1,024) of the Frame FIFO 24, and transfers the frame to the proxy FC port 6.

The proxy FC port 6 receives this ELP Request frame and stores it in the Frame FIFO 24. At this time, since the credit counter 28 of the proxy FC port 6 is "1" or more, the transmission control section 25 immediately acquires the frame stored in the Frame FIFO 24 and transfers it to the BB_Credit exchange request detecting section 26. At the same time, the transmission control section 25 decrements the value of the credit counter 28 by "1".

The BB_Credit exchange request detecting section 26 detects that this signal is an ELP Request frame, notifies the BB_Credit detecting/rewriting section 30 of the corresponding information, and transfers the frame to the FC device 7.

The FC device 7 receives the ELP Request frame transferred from the proxy FC port 6, and sets BB_Credit (=1,024), stored in this frame, in the credit counter.

The FC device 7 returns R_RDY for the ELP Request frame. Upon detecting R_RDY through the Primitive detecting section 31, the proxy FC port 6 increments the value of the credit counter 28 by "1" and transfers R_RDY to the proxy FC port 2.

The proxy FC port 2 transfers received R_RDY to the FC device 1 through the Primitive FIFO 23. Upon receiving R_RDY, the FC device 1 increments the value of the credit counter by "1".

The FC device 7 stores its own BB_Credit (=4) in the ELP Request frame as a response to the ELP Request frame, and transmits the frame to the FC device 1.

Since the proxy FC port 6 has detected the ELP Request frame through the BB_Credit exchange request detecting section 26, the proxy FC port 6 detects an ELP Accept frame through the BB_Credit detecting/rewriting section 30, and sets BB_Credit (=4), stored in this frame, in the credit counter 28.

At the same time, the proxy FC port 6 rewrites the value of BB_Credit in this frame into the number of frames (=1,024) that can be stored in the Frame FIFO 24, and transfers the frame to the proxy FC port 2.

Upon receiving the ELP Accept frame, the proxy FC port 2 stores the frame in the Frame FIFO 24, and decrements the credit counter 28 by "1" through the transmission control section 25. The proxy FC port 2 then transfers this frame to the FC device 1.

The FC device 1 receives the ELP Accept frame, and sets BB_Credit (=1,024), stored in this frame, in the credit counter.

The FC device 1 returns R_RDY for the ELP Accept frame to the FC device 7.

Upon detecting R_RDY through the Primitive detecting section 31, the proxy FC port 2 increments the value of the credit counter 28 by "1", and transfers R_RDY to the proxy FC port 6.

The proxy FC port 6 transfers received R_RDY to the FC device 7 through the Primitive FIFO 23. Upon receiving R_RDY, the FC device 7 increments the value of the credit counter by "1".

With the above processing, the BB_Credit exchange processing is completed.

Figure 6:
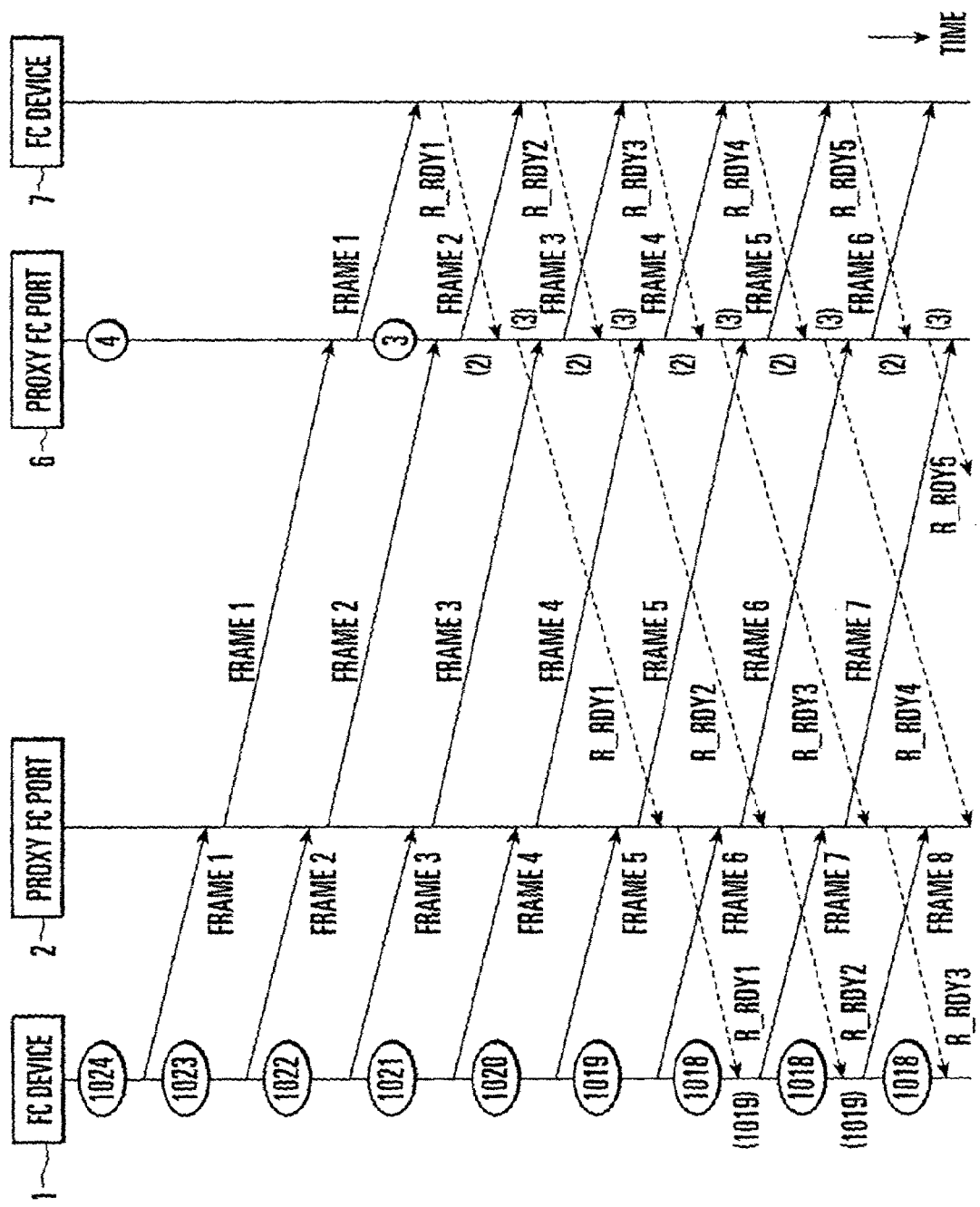
FIG. 6 is a view showing operation to be performed when processing is performed in the FC devices and proxy FC ports in FIG. 1.

FIG. 6 shows how Class 3 frames are continuously transmitted from the FC device 1 to the FC device 7.

In the initial state in FIG. 6, which appears immediately after BB_Credit is exchanged in FIG. 5, "1024" is set in the credit counter of each of the FC devices 1 and 7, and "4" is set in the credit counter 28 of each of the proxy FC ports 2 and 6.

The FC device 1 decrements the value of the credit counter "1" every time one frame is transmitted. Since the initial value of the credit counter is "1024", the FC device 1 can transmit frames without waiting for a response of R_RDY until 1,024 frames are transmitted. The proxy FC port 2 transfers, to the proxy FC port 6, the frame transmitted from the FC device 1.

The proxy FC port 6 detects the reception of Class 3 frames through the frame separating section 22, and sequentially transfers the frames in the Frame FIFO 24. The transmission control section 25 sequentially transfers the frames stored in the Frame FIFO 24, and decrements the credit counter 28 by "1" every time one frame is transferred.

In this case, since the value of the credit counter 28 is always "1" or more, the frame stored in the Frame FIFO 24 is immediately output. As a consequence, a plurality of frames will never be stored in the Frame FIFO 24.

The FC device 7 returns R_RDY every time a frame is received. Upon detecting R_RDY through the Primitive detecting section 31, the proxy FC port 6 increments the credit counter 28 by "1", and transfers R_RDY to the proxy FC port 2. In this case, while frames are transferred, the value of the credit counter 28 of the proxy FC port 6 repeatedly switches between "3" and "2".

The proxy FC port 2 stores received R_RDY in the Primitive FIFO 23, and immediately transfers it to the FC device 1. Upon receiving R_RDY, the FC device 1 increments the credit counter by "1".

In the case shown in FIG. 6, since the frame processing speed of the FC device 7 is higher than the frame transmission rate of the FC device 1, although a frame is once stored in the Frame FIFO of the proxy FC port 6, since it is transmitted immediately, it is not accumulated in appearance.

In the case shown in FIG. 6, the value of the credit counter 28 of the proxy FC port 6 repeatedly switches between "3" and "2", and the value of the credit counter of the FC device 1 repeatedly switches between "1019" and "1018".

In the absence of the proxy FC port 6, the credit counter of the FC device 1 starts from "4" which is BB_Credit of the FC device 7. For this reason, the credit counter becomes "0" when four frames are transmitted, and transmission is stopped until the reception of R_RDY. Since the proxy FC port 6 is present, the initial value of the credit counter increases to "1024", and frames can be continuously transmitted up to the 1,024th frame.

Figure 7:
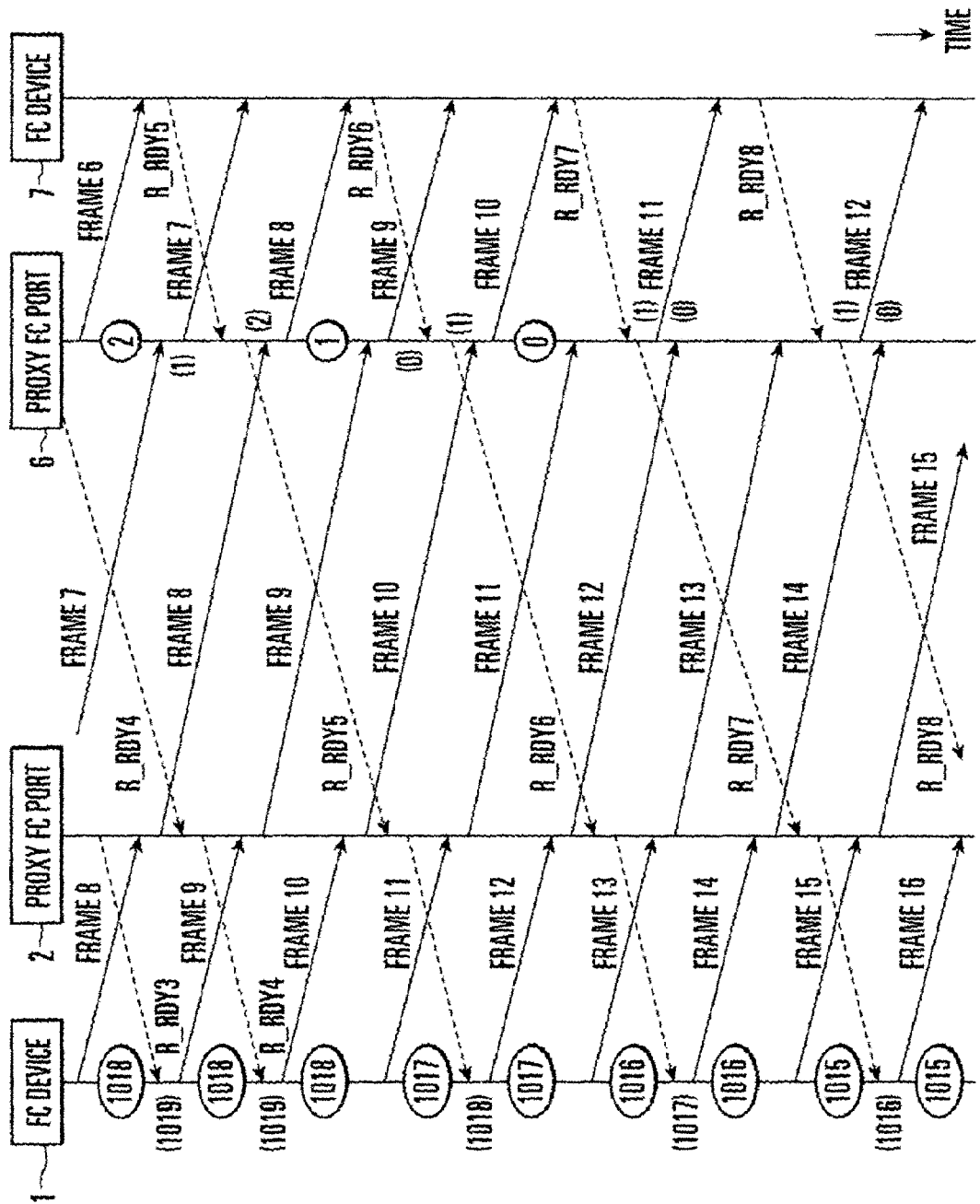
FIG. 7 is a view showing operation to be performed when processing is performed in the FC devices and proxy FC ports in FIG. 1.

FIG. 7 shows a state wherein the frame processing speed of the FC device 7 is lower than the frame transmission rate of the FC device 1.

The speed of R_RDY returned from the FC device 7 is lower than that of a frame transferred from the FC device 1. For this reason, in the proxy FC port 6, after the value of the credit counter 28 reaches "0", its value repeatedly switches between "0" and "1" in accordance with the return speed of R_RDY, and frames are stored in the Frame FIFO 24.

This operation represents a state wherein flow control is activated between the proxy FC port 6 and the FC device 7. Since the reception speed of R_RDY is lower than the frame transmission rate, the value of the credit counter of the FC device 1 is decremented.

Figure 8:
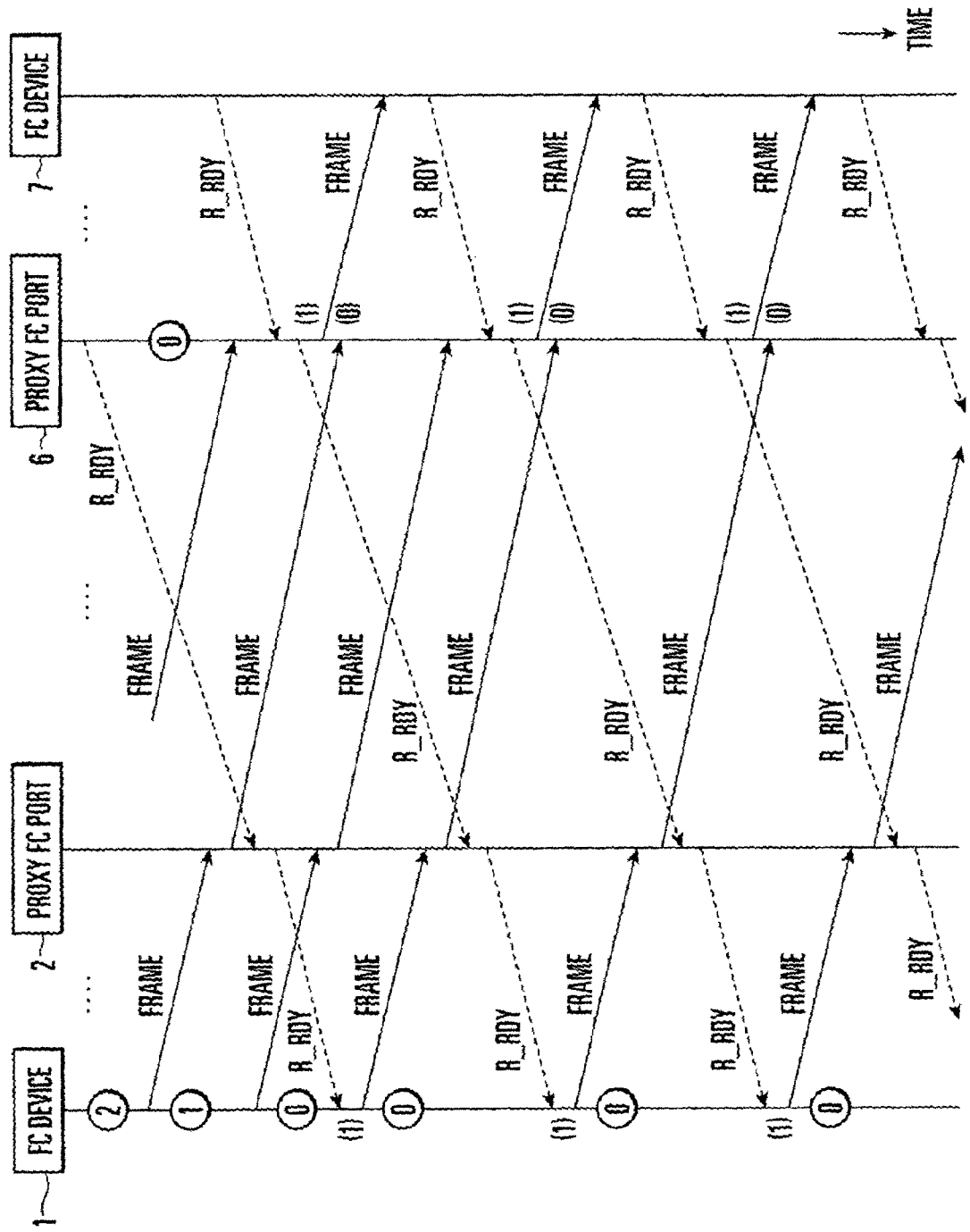
FIG. 8 is a view showing operation to be performed when processing is performed in the FC devices and proxy FC ports in FIG. 1.

FIG. 8 shows operation to be performed when the credit counter of the FC device 1 reaches "0" because the frame transmission rate of the FC device 1 is higher than the frame processing speed of the FC device 7.

The FC device 1 stops transmitting frames while the credit counter is "0". When the credit counter becomes "1" upon receiving R_RDY, the FC device 1 transmits one frame. As a consequence, the credit counter becomes "0" again. The FC device 1 repeats this operation.

This operation represents a state wherein flow control is activated between the FC device 1 and the FC device 7.

Figure 9:
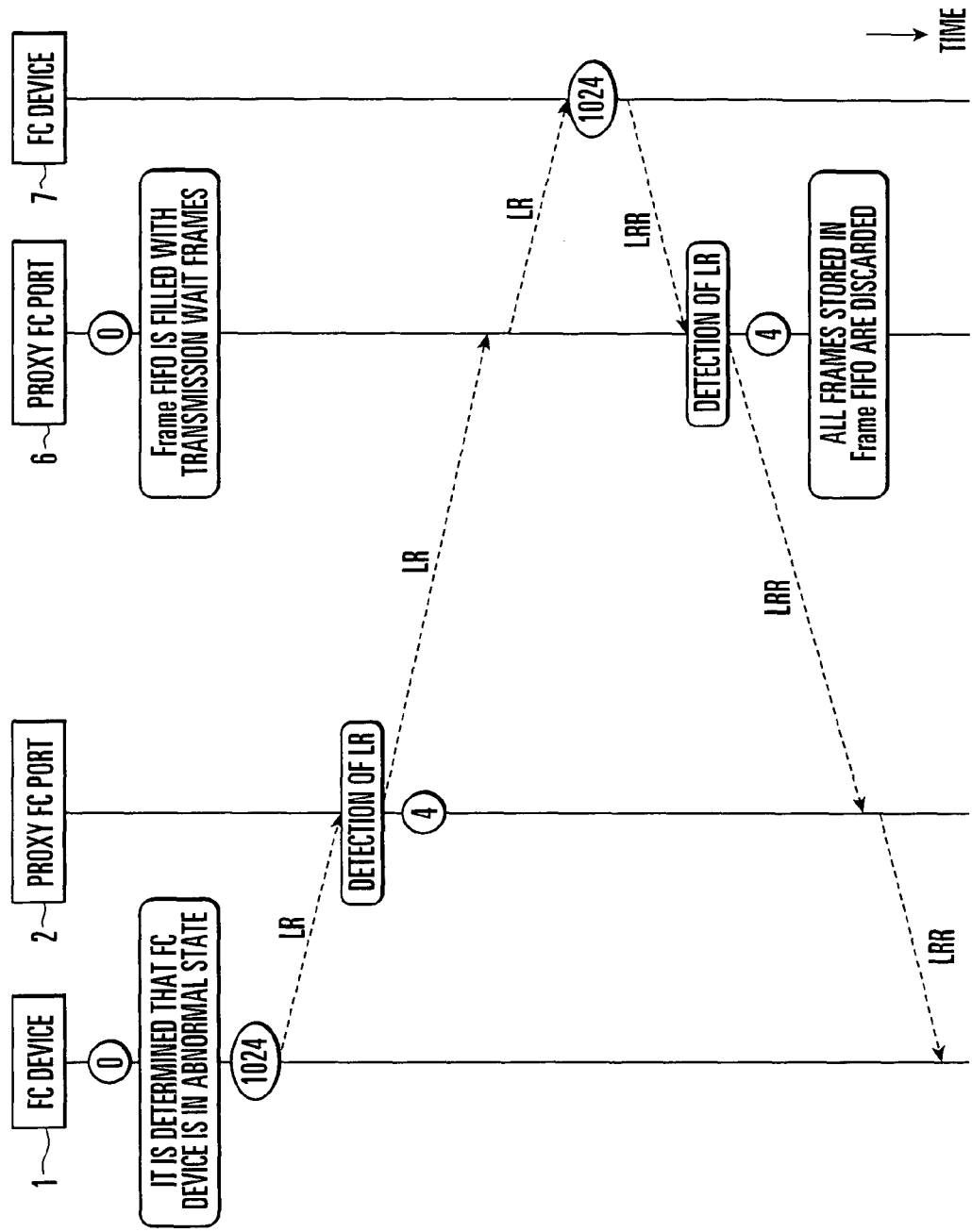
FIG. 9 is a view showing operation to be performed when processing is performed in the FC devices and proxy FC ports in FIG. 1.

FIG. 9 shows operation to be performed when recovery processing is performed between the FC device 1 and the FC device 7 by Link Reset because no R_RDY is returned due to an abnormality in the FC device 7, and the credit counters of the FC device 1 and proxy FC port 6 do not change from "0".

Upon returning the value of the credit counter to "1024", the FC device 1 transmits LR.

Upon detecting LR through the Primitive detecting section 31, the proxy FC port 2 returns the value of the credit counter 28 to "4", and at the same time, discards all the frames left in the Frame FIFO 24.

The proxy FC port 2 transfers received LR to the FC device 7 through the Primitive FIFO 23.

Upon receiving LR, the FC device 7 returns the value of the credit counter to "1024", and returns LRR. Upon detecting LRR through the Primitive detecting section 31, the proxy FC port 6 returns the value of the credit counter 28 to "4".

At the same time, the proxy FC port 6 discards all the frames left in the Frame FIFO 24, and transfers LRR to the proxy FC port 2.

The proxy FC port 2 transfers received LRR to the FC device 1 through the Primitive FIFO 23. When the FC device 1 receives this, the recovery processing is completed.

Figure 12:
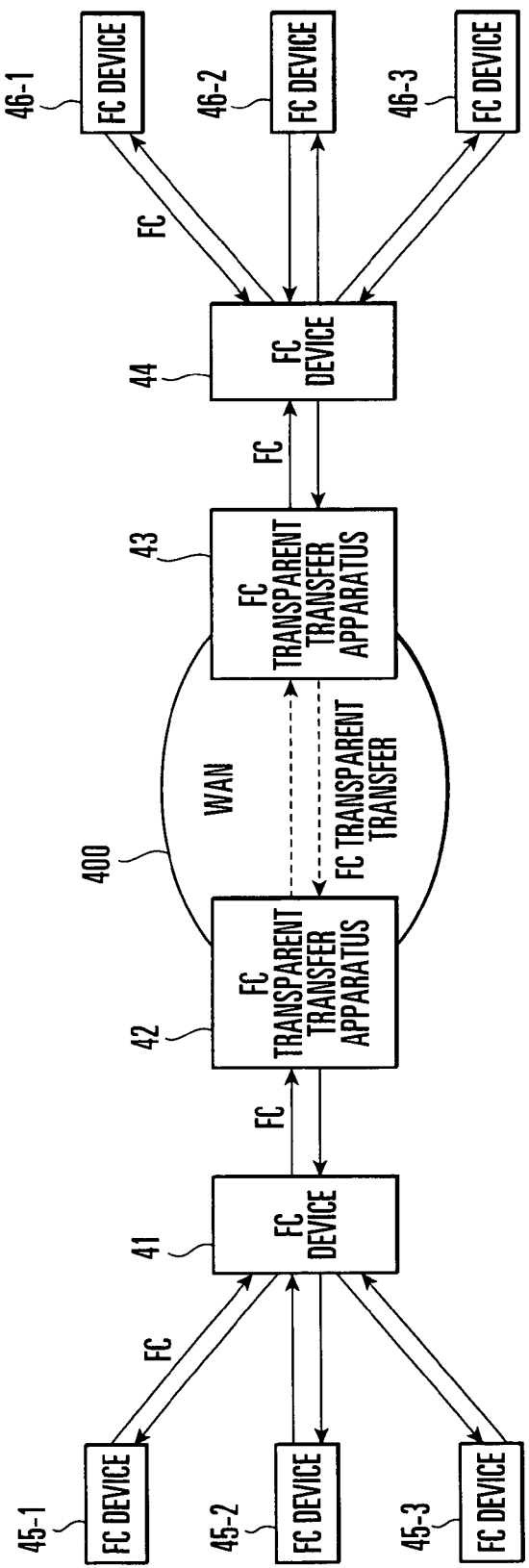
FIG. 12 is a block diagram showing the arrangement of a conventional FC network.
Figures 13A, 13B:
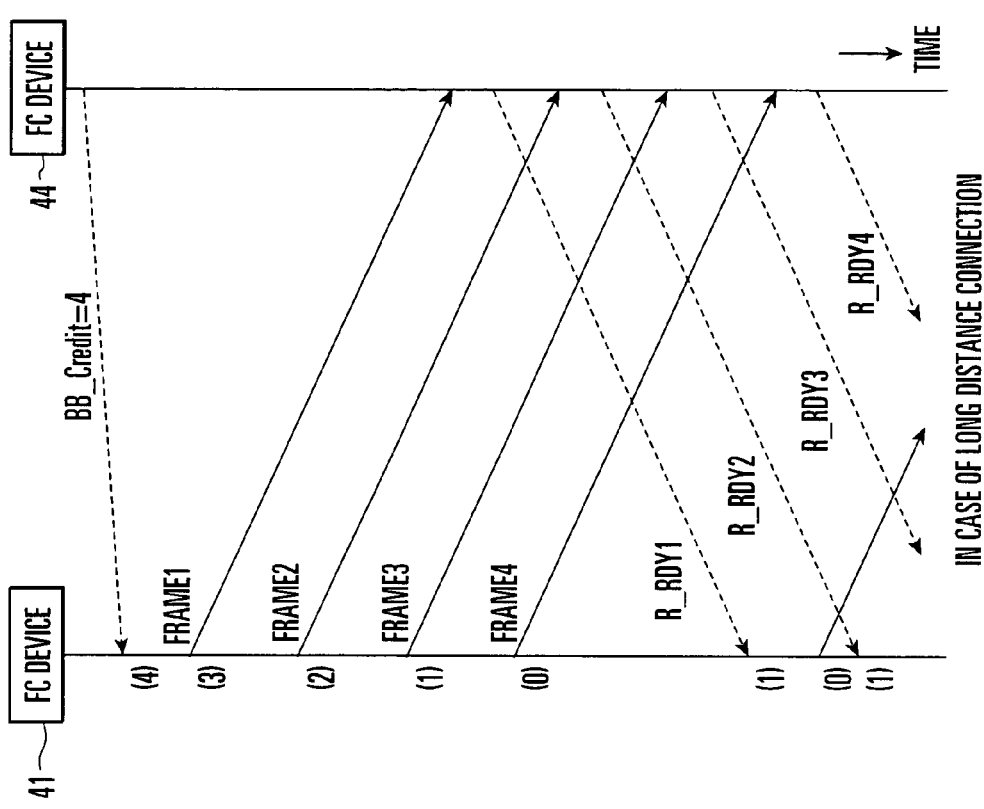
FIG. 13A is a view showing the operation of an FC network in a case of conventional short-distance connection.
FIG. 13B is a view showing the operation of an FC network in a case of conventional long-distance connection.

In an FC network in which two FC devices 41 and 44 are long-distance-connected to each other through the WAN 400 by using FC transparent transfer apparatuses 42 and 43 as shown in FIG. 12, if the FC devices 41 and 44 incorporate no reception buffers large enough for the connection distance, the frame transfer rate decreases due to BB flow control as shown in FIG. 13.

In this embodiment, since the proxy FC ports 2 and 6 are arranged between the FC transparent transfer apparatuses 3 and 4 and the FC devices 1 and 7, the reception buffers in the FC devices 1 and 7 can be virtually increased. This makes it possible to avoid a decrease in frame transfer rate due to a delay in the transmission path even if the FC devices 1 and 7 having small reception buffers are long-distance-connected to each other.

The arrangement of an FC network according to another embodiment will be described next. The arrangement of this FC network is the same as that according to the first embodiment of the present invention shown in FIG. 1 except that the functions of the proxy FC ports 2 and 6 described above are incorporated in FC transparent transfer sections 12 and 15 in FIG. 10.

More specifically, the FC network according to this embodiment of the present invention is comprised of FC devices 11 and 18, the FC transparent transfer sections 12 and 15 constituted by proxy FC port sections 13 and 17 and FC transparent transfer sections 14 and 16 and connected to the FC devices 11 and 18, and a WAN 100 which connects the FC transparent transfer sections 12 and 15 to each other.

Figure 10:
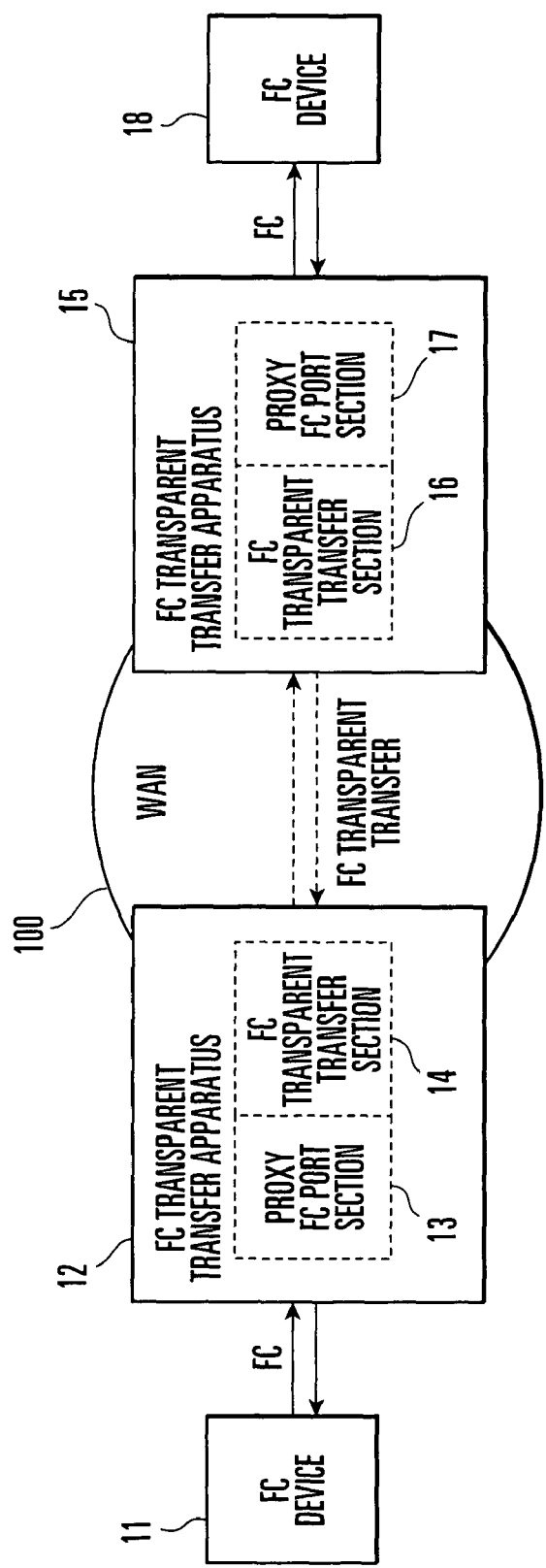
FIG. 10 is a block diagram showing the arrangement of an FC network according to another embodiment of the present invention.
Figure 11:
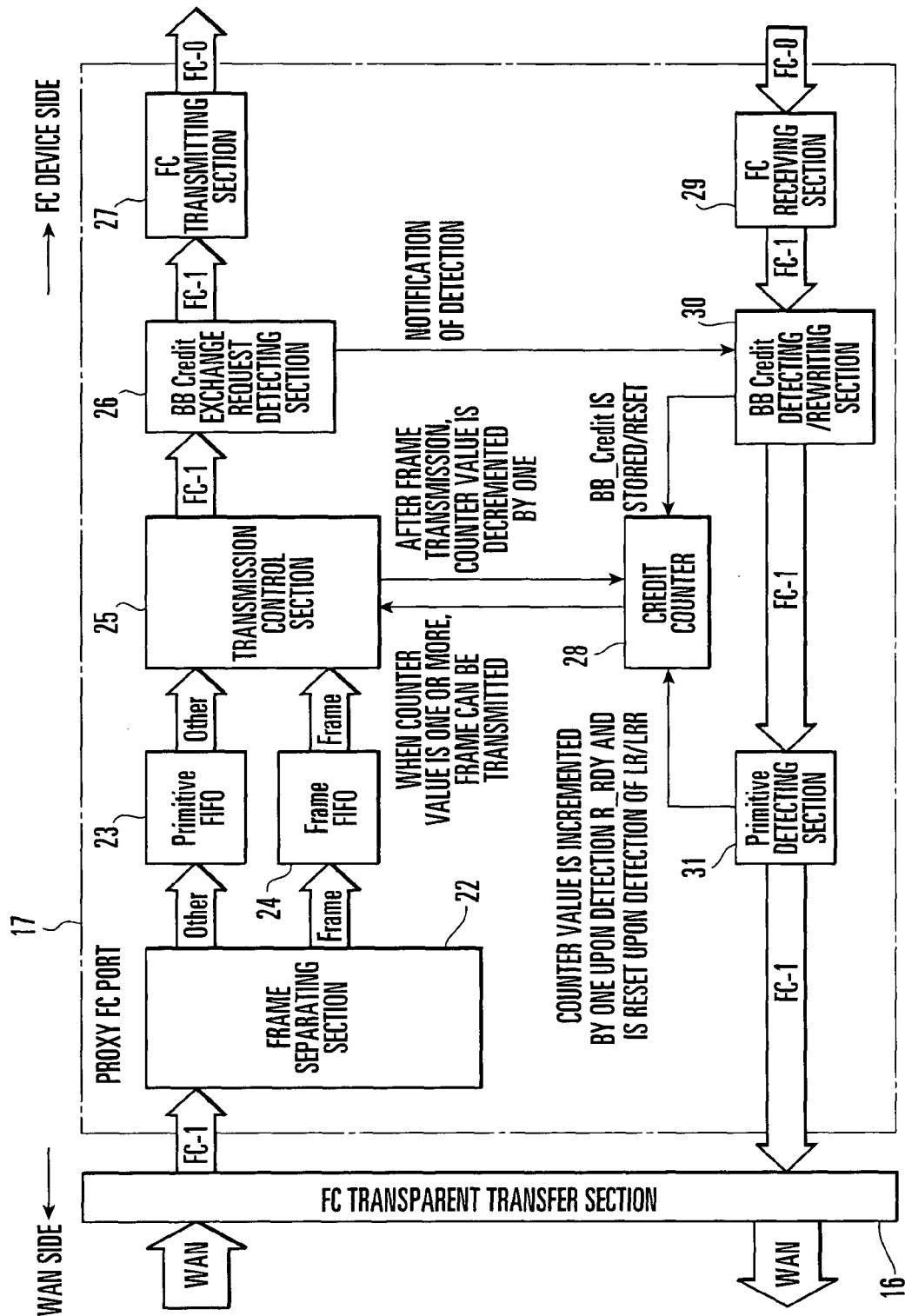
FIG. 11 is a block diagram showing the internal arrangement of an FC transparent transfer apparatus in FIG. 10.

The internal arrangement of the FC transparent transfer section 15 in FIG. 10 will be described with reference to FIG. 11. Referring to FIG. 11, the FC transparent transfer section 15 is comprised of the FC transparent transfer section 16 and proxy FC port section 17. The FC transparent transfer section 16 implements a function of converting the FC-1 signal transferred from the preceding block into a WAN signal and transferring the signal to the other. FC transparent transfer section 12 connected to the WAN 100, and a function of reconstructing an FC-1 signal from a WAN signal and transferring the signal to the succeeding block.

In this case, the FC transparent transfer section 15 includes the proxy FC port section 17 which provides all the functions realized by the proxy FC port 2 except for the FC transmission and reception functions (FC receiving section 21 and FC transmitting section 32).

That is, the proxy FC port section 17 has the same function as that of the proxy FC port 2 shown in FIG. 2, and includes a frame separating section 22 connected to the FC transparent transfer section 16, a Primitive FIFO 23 connected to the frame separating section 22, and a Frame FIFO 24.

The proxy FC port section 17 includes a transmission control section 25 connected to the Primitive FIFO 23 an Frame FIFO 24, a BB_Credit exchange request detecting section 26 connected to the transmission control section 25, and an FC transmitting section 27 connected to the BB_Credit exchange request detecting section 26.

The proxy FC port section 17 includes a credit counter 28 connected to the transmission control section 25, and a Primitive detecting section 31 connected to the credit counter 28. The Primitive detecting section 31 is connected to the FC transparent transfer section 16.

The proxy FC port section 17 includes a BB_Credit detecting/rewriting section 30 connected to the BB_Credit exchange request detecting section 26, credit counter 28, and Primitive detecting section 31, and an FC receiving section 29 connected to the BB_Credit detecting/rewriting section 30.

Note that the proxy FC port section 13 has the same arrangement as that of the proxy FC port section 17 described above, and operates in the same manner as the proxy FC port section 17.

This embodiment operates in the same manner as the FC network according to the above embodiment of the present invention except that the functions of the proxy FC ports 2 and 6 (proxy FC port sections 13 and 17) are implemented in the FC transparent transfer sections 12 and 15. A description of this operation will therefore be omitted. Furthermore, the effects obtained by this embodiment are the same as those of the above embodiment of the present invention.

As has been described above, according to the present invention, in an FC network in which signals to be exchanged between one pair of FC devices are transferred by using one pair of FC transparent transfer apparatuses connected to each other through a WAN, proxy FC ports incorporate reception buffers having larger capacities than the reception buffers incorporated in the FC devices, and buffer flow control is performed for the reception buffers of the FC devices by using the large-capacity reception buffers.

This makes it possible to virtually increase the capacities of the reception buffers and avoid a decrease in frame transfer rate due to a delay in the transaction path even if the EC devices having small reception buffers are long-distance-connected to each other.

In the FC network according to the present invention, i.e., a wide area FC (Fibre Channel) network built through a WAN (Wide Area Network), proxy FC ports which provide large-capacity reception buffers in place of FC devices are arranged between FC devices and FC transparent transfer apparatuses.

This arrangement can prevent the problem that when FC devices having small reception buffers are long-distance-connected to each other through a WAN, a decrease in frame transfer rate is caused by flow control.

More specifically, the reception buffer size (BB_Credit) notified from the FC device on the receiving side to the FC device on the transmitting side is rewritten to the size of the reception buffer incorporated in the proxy FC port. This increases the initial value of the credit counter of the FC device on the transmitting side. As a consequence, in the FC network of the present invention, the credit counter never becomes "0" due to the influence of a delay in the long-distance transmission path, and hence the frame transfer rate never decreases as the credit counter becomes "0".

If the frame processing speed of the FC device on the receiving side is lower than the frame transmission rate of the FC device on the transmitting side, frames transferred at rates exceeding the processing speed of the FC device on the receiving side are stored in the reception buffer (Frame FIFO (First-In First-Out)) of the proxy FC port. This makes it possible to realize flow control and prevent frame loss as the reception buffer becomes "0".

In addition, incorporating the function of the above proxy FC port in the FC interface section of each FC transparent transfer apparatus can implement the same function as that described above.

What is claimed is:

1. A proxy FC port in an FC network, which is connected between first and second FC (Fibre Channel) devices having reception buffers and first and second FC transfer apparatuses connected to each other through a WAN (Wide Area Network), and transfers signals to be exchanged between the first and second FC devices, comprising:

storage means having a larger capacity than the reception buffer;

transmission control means for performing flow control on the first and second FC devices on the basis of a remaining capacity of said storage means; and reception buffer size rewriting means for rewriting reception buffer size information of the second FC device which is stored in a frame transmitted from the second FC device on a receiving side to the first FC device on a transmitting side into information of the number of frames that can be stored in said storage means.

2. A port according to claim 1, wherein
said port further comprises:
a counter which indicates a remaining capacity of the reception buffer, and
setting means for setting a value for said counter, and
said transmission control means performs flow control on the first and second FC devices on the basis of the remaining capacity of said counter.

3. A port according to claim 1, further comprising frame separating means for storing, in said storage means, a frame transferred at a rate exceeding a processing speed of the second FC device on the receiving side when a frame processing speed of the second FC device on the receiving side is lower than a frame transmission rate of the first FC device on the transmitting side.

4. A port according to claim 1, further comprising:
a receiving section which receives FC signals from the first and second FC devices,
a converting section which converts received FC signal into various kinds of WAN (Wide Area Network) signals,
a transmitting section which transfers various kinds of converted WAN signals to a remote FC transfer apparatus through the WAN, and
a decoding section which decodes signals from various kinds of WAN signals.

5. A port according to claim 1, further comprising a detecting section which increases a remaining capacity of a counter when R_RDY (Receiver Ready) is detected from a signal received from a corresponding FC device.

6. A port according to claim 1, wherein the FC device comprises:
a transmitting/receiving section having an FC interface, and
a reception buffer which stores a frame.

7. An FC network system comprising:
first and second FC (Fibre Channel) devices having reception buffers;
first and second FC transfer apparatuses connected to each other through a WAN (Wide Area Network); and
proxy FC ports which are connected between said first and second FC transfer apparatuses and transfer signals to be exchanged between said first and second FC devices,
wherein said proxy FC ports include
storage means having larger capacities than the reception buffers,
transmission control means for performing flow control on the reception buffers on the basis of a remaining capacity of said storage means; and
reception buffer size rewriting means for rewriting reception buffer size information of said second FC device which is stored in a frame transmitted from said second FC device on a receiving side to said first FC device on a transmitting side into information of the number of frames that can be stored in said storage means.

8. A system according to claim 7, wherein
said proxy FC port further comprises:
a counter which indicates a remaining capacity of the reception buffer, and
setting means for setting a value for said counter, and
said transmission control means performs flow control on the first and second FC devices on the basis of the remaining capacities of the counters.

9. A system according to claim 7, wherein said proxy FC ports further comprise frame separating means for storing, in said storage means, a frame transferred at a rate exceeding a processing speed of said second FC device on the receiving side when a frame processing speed of said second FC device on the receiving side is lower than a frame transmission rate of said first FC device on the transmitting side.

10. A system according to claim 7, wherein said proxy FC ports further comprise receiving sections which receive FC signals from said first and second FC devices, converting sections which convert received FC signals into various kinds of WAN (Wide Area Network) signals, transmitting sections which transfer various kinds of converted WAN signals to remote FC transfer apparatuses through the WAN, and decoding sections which decode signals from various kinds of WAN signals.

11. A system according to claim 7, wherein said proxy FC ports further comprise detecting sections which increase remaining capacities of counters when R_RDY (Receiver Ready) is detected from signals received from corresponding FC devices.

12. An FC transfer method for an FC network which transfers signals to be exchanged between first and second FC (Fibre Channel) devices having reception buffers by using first and second FC transfer apparatuses connected to each other through a WAN (Wide Area Network) and proxy FC ports which are arranged between the FC devices and the FC transfer apparatuses and transfer signals to be exchanged between the first and second FC devices, comprising the steps of:
receiving, from the first FC device, a frame in which information of the maximum number of frames that can be stored in a reception buffer of the FC device is stored;
detecting the information of the maximum number of frames from the frame and changing the detected information of the maximum number of frames; and
transferring the frame to the second FC device, wherein the changing step comprises the step of rewriting the information of the maximum number of frames into information of the number of frames that can be stored in storage means of the proxy FC port.

13. A method according to claim 12, further comprising the step of storing, in storage means, a frame transferred at a rate exceeding a processing speed of the second FC device on a receiving side when a frame processing speed of the second FC device on the receiving side is lower than a frame transmission rate of the first FC device on a transmitting side.

14. A method according to claim 12, further comprising the steps of:
receiving R_RDY (Receiver Ready) from the second FC device, and
increasing a remaining amount of a counter which indicates a remaining capacity of the reception buffer of the first FC device.

15. A method according to claim 12, wherein a function of the proxy FC port is incorporated in the FC transfer apparatus.

* * * * *